Feb. 5, 1952 C. B. HATFIELD 2,584,582
FLUID PUMP OR MOTOR
Filed March 23, 1945 12 Sheets-Sheet 5
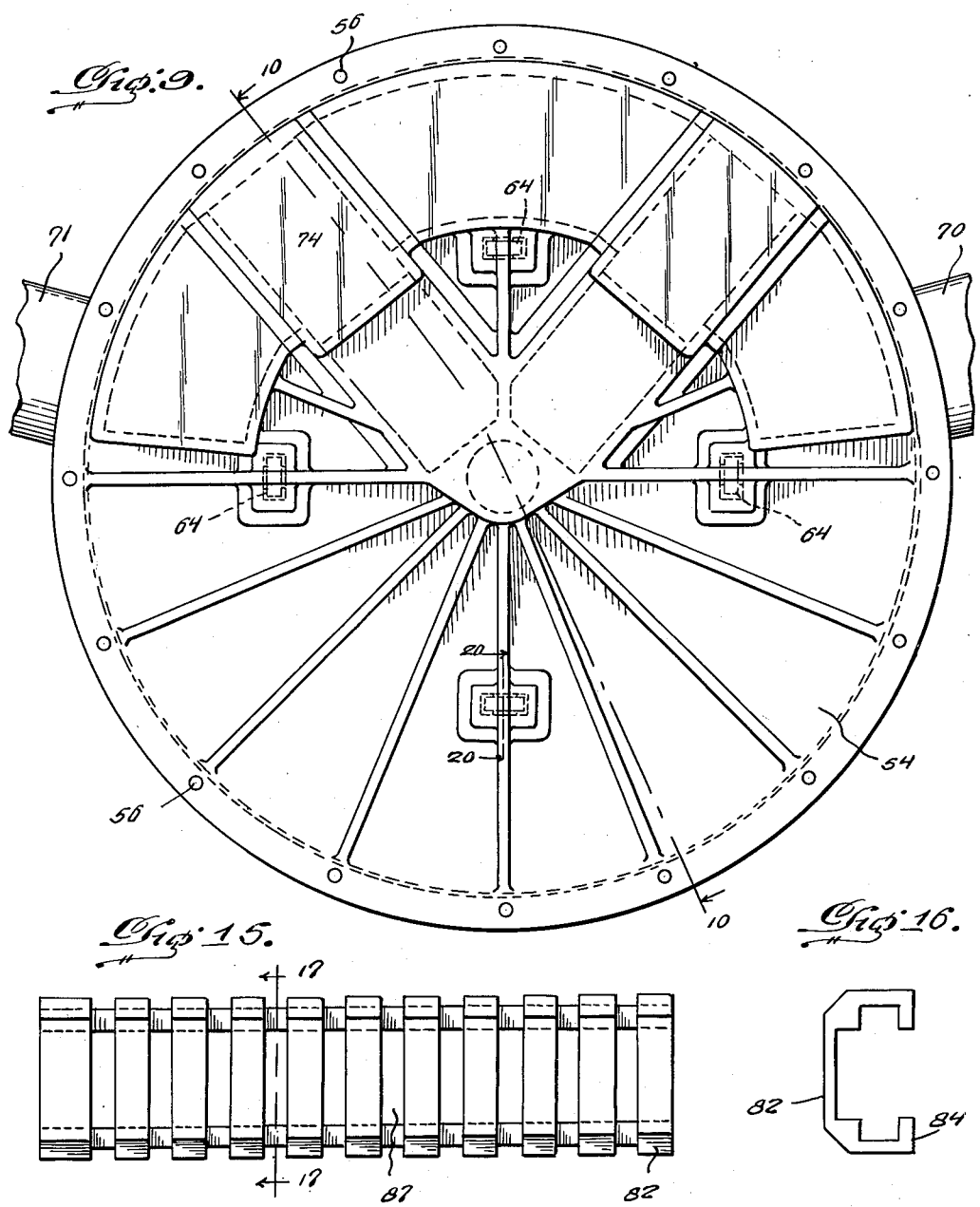

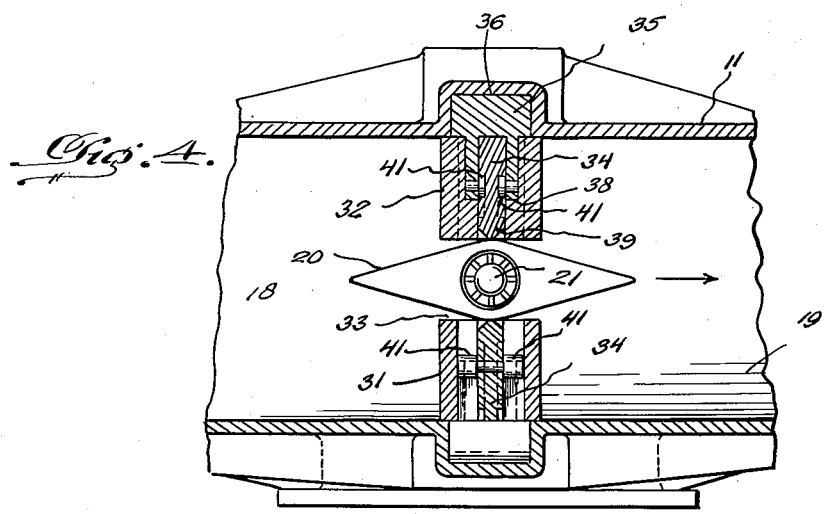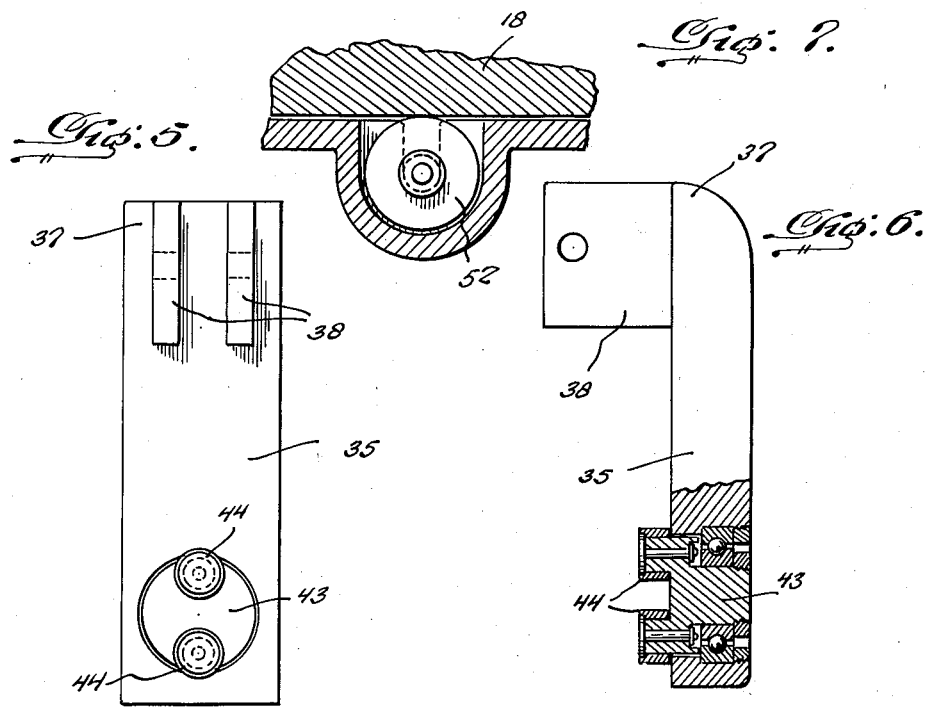

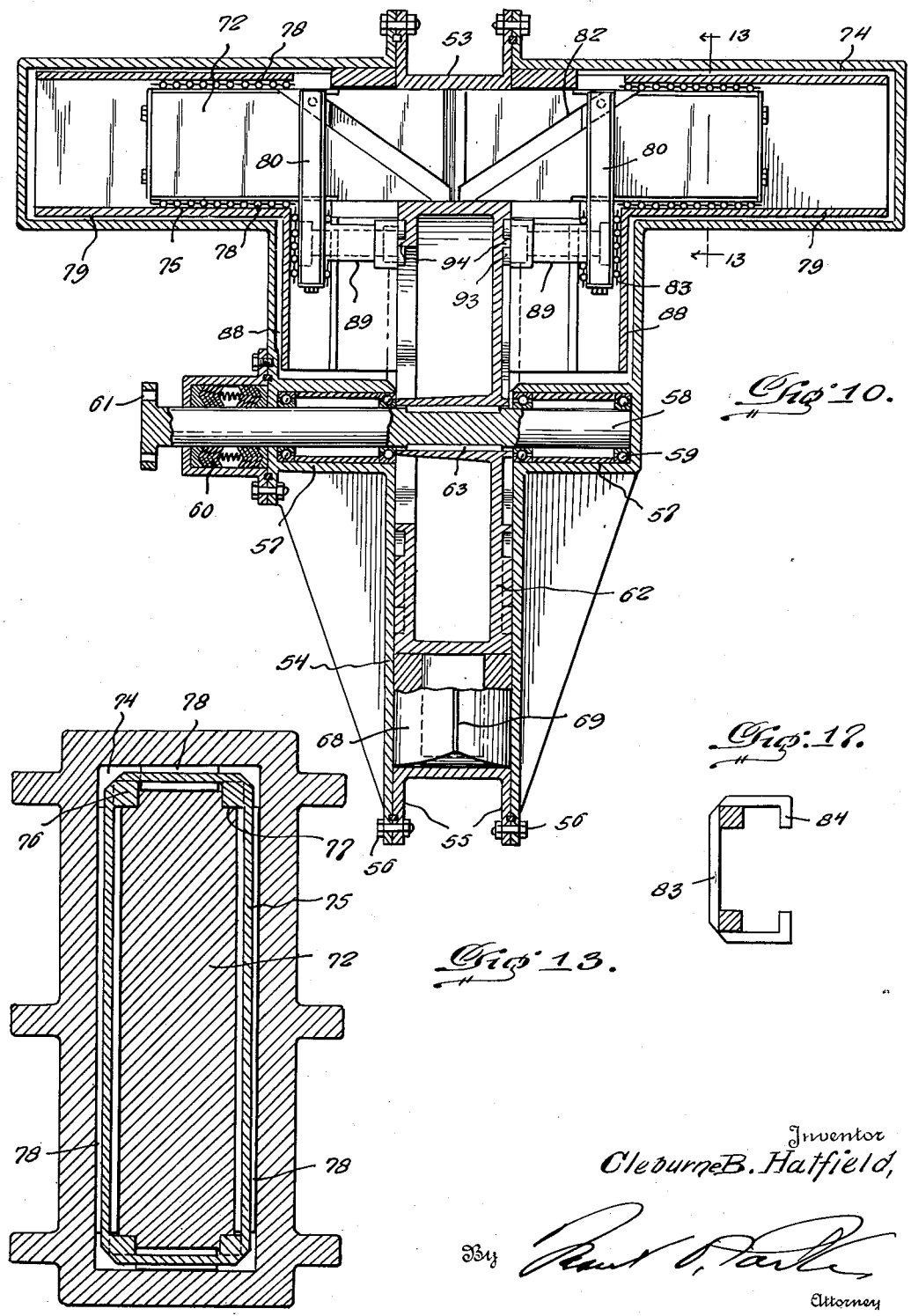

Feb. 5, 1952     C. B. HATFIELD     2,584,582
FLUID PUMP OR MOTOR

Filed March 23, 1945     12 Sheets-Sheet 7

Inventor
Cleburne B. Hatfield,
By [signature]
Attorney

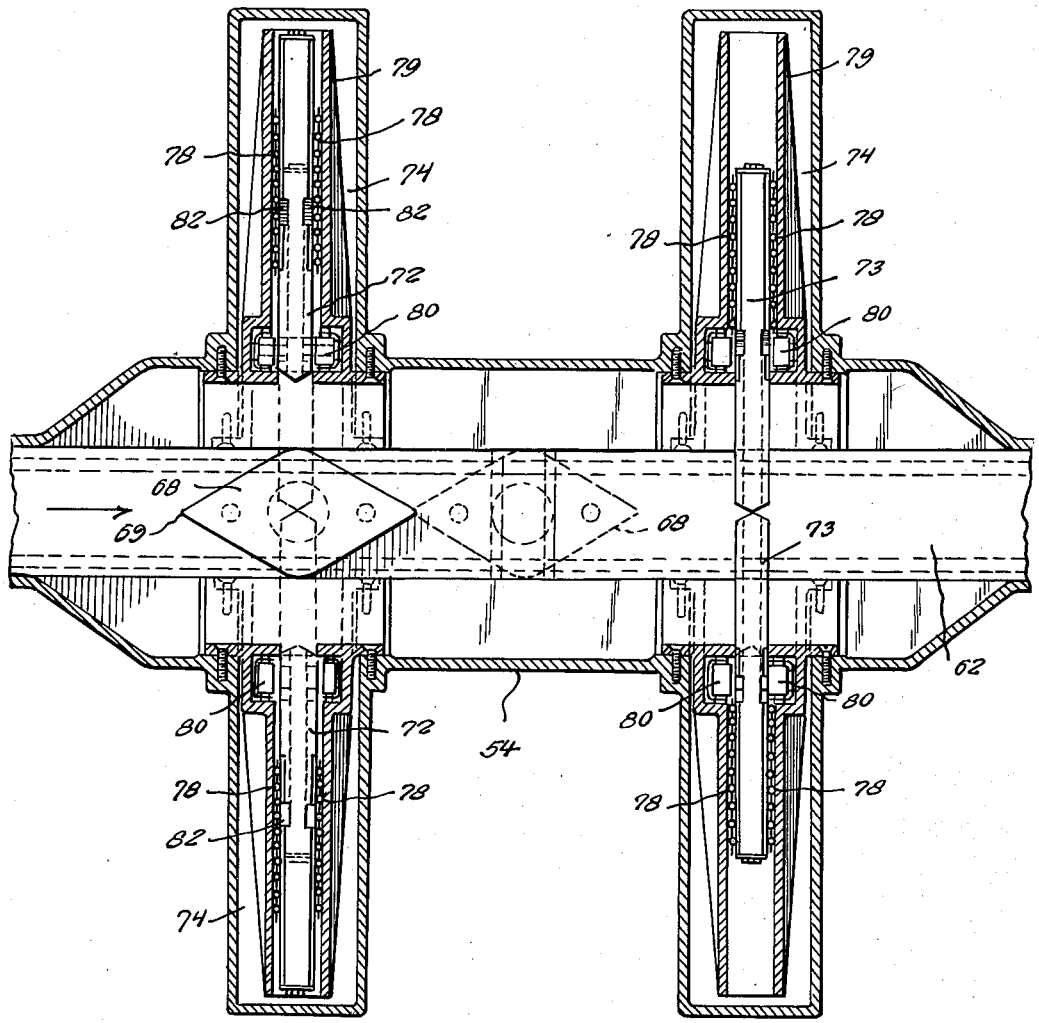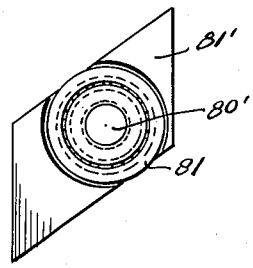

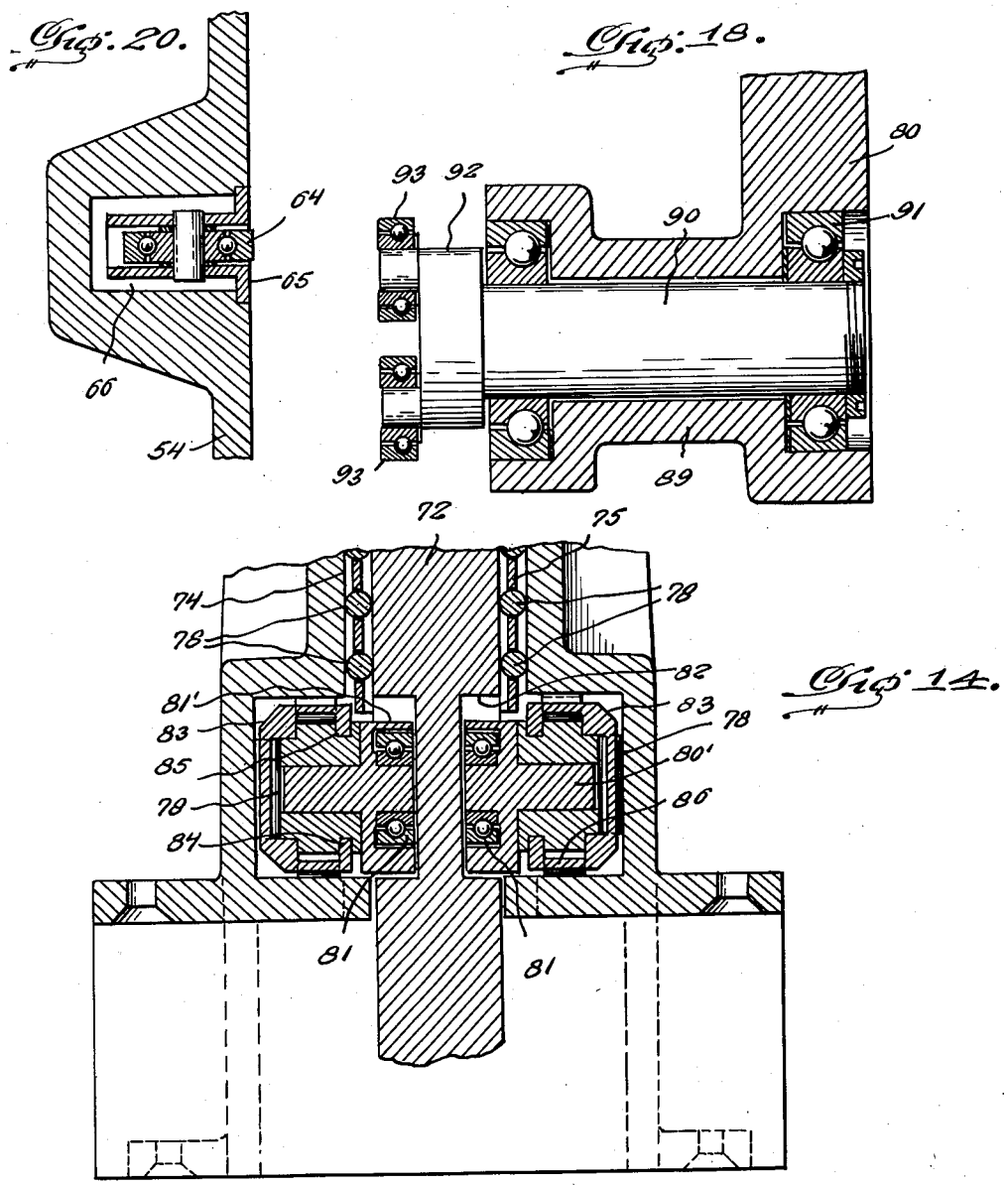

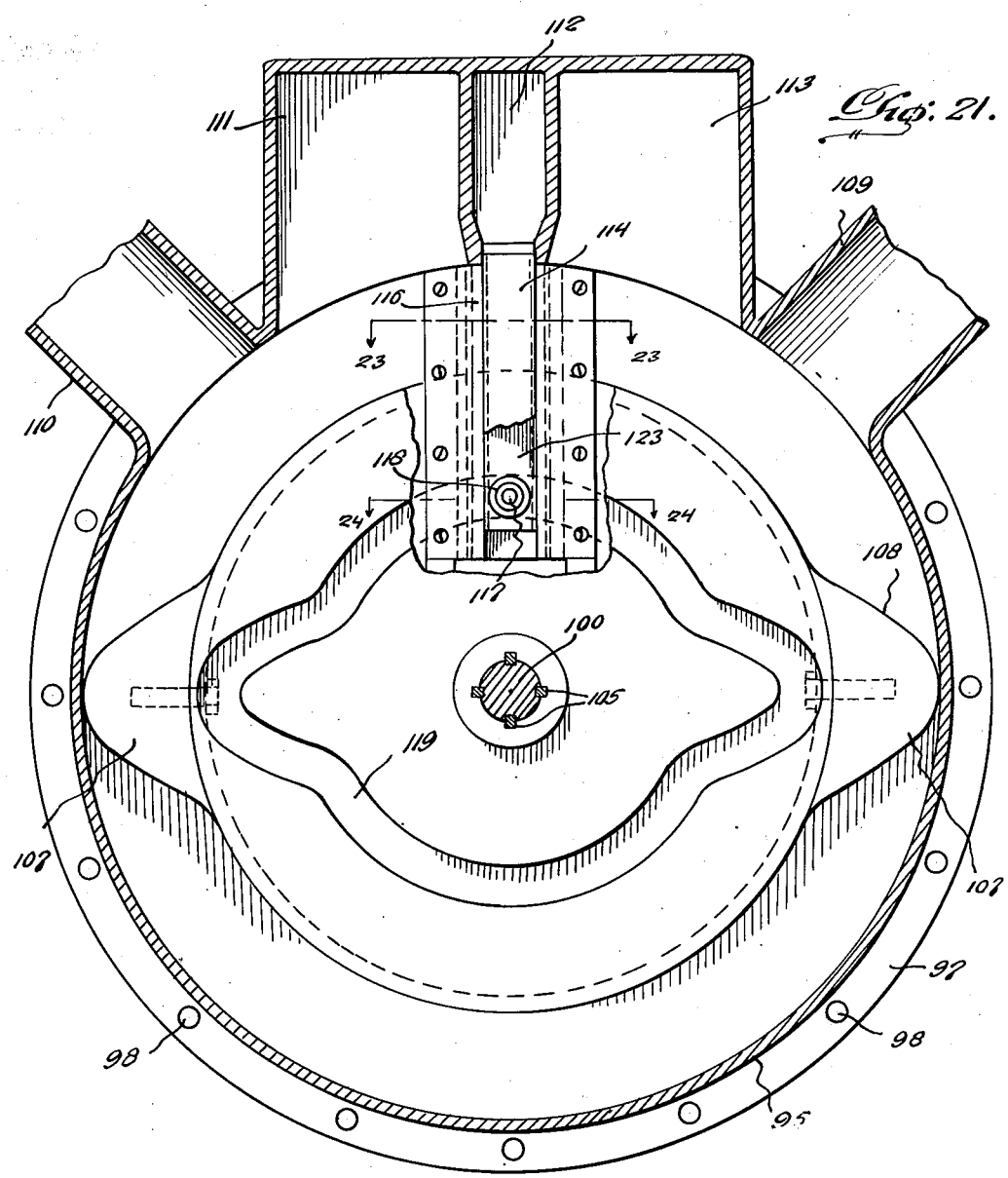

Feb. 5, 1952 C. B. HATFIELD 2,584,582
FLUID PUMP OR MOTOR
Filed March 23, 1945 12 Sheets-Sheet 11
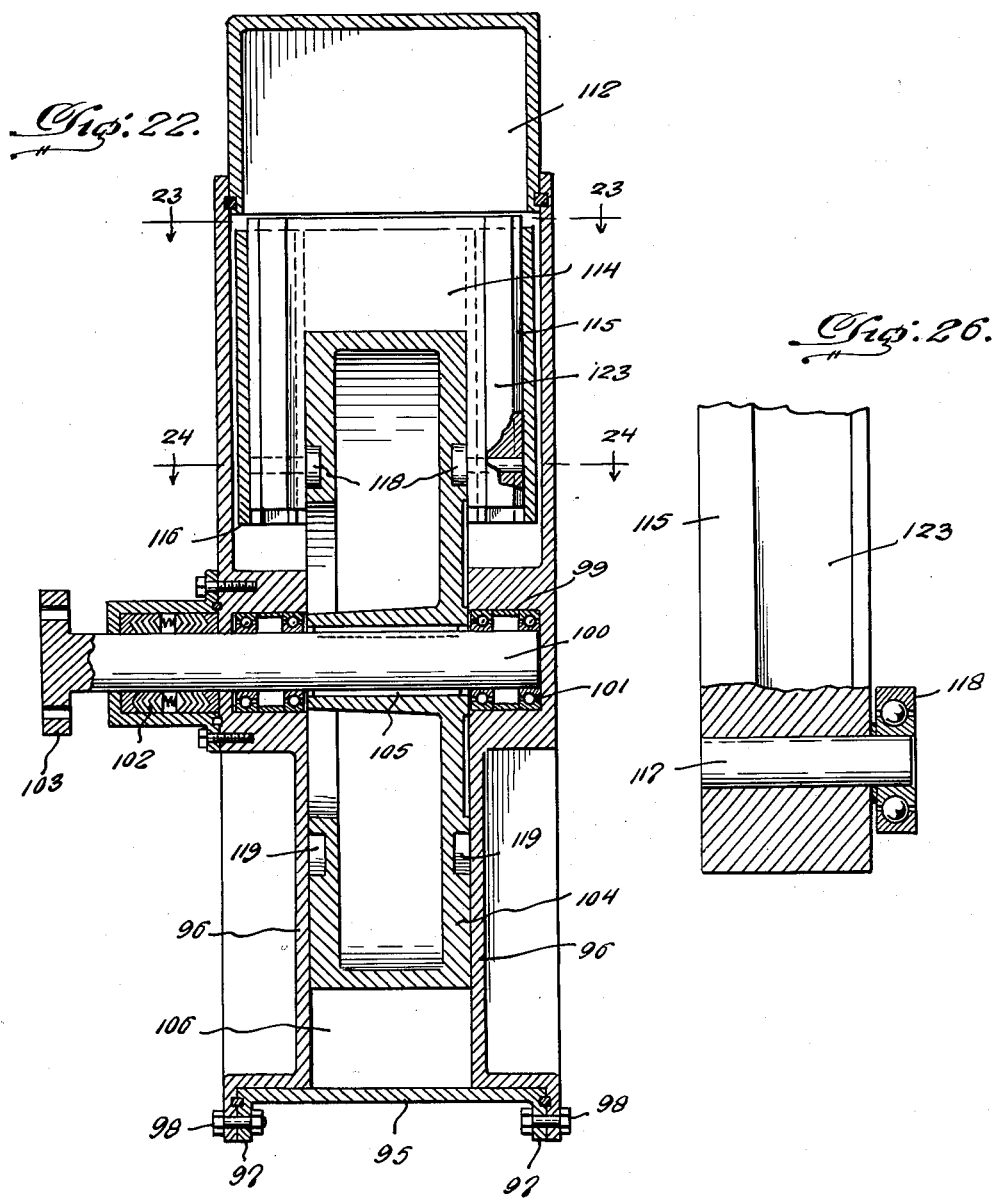
Inventor
Cleburne B. Hatfield,
By
Attorney

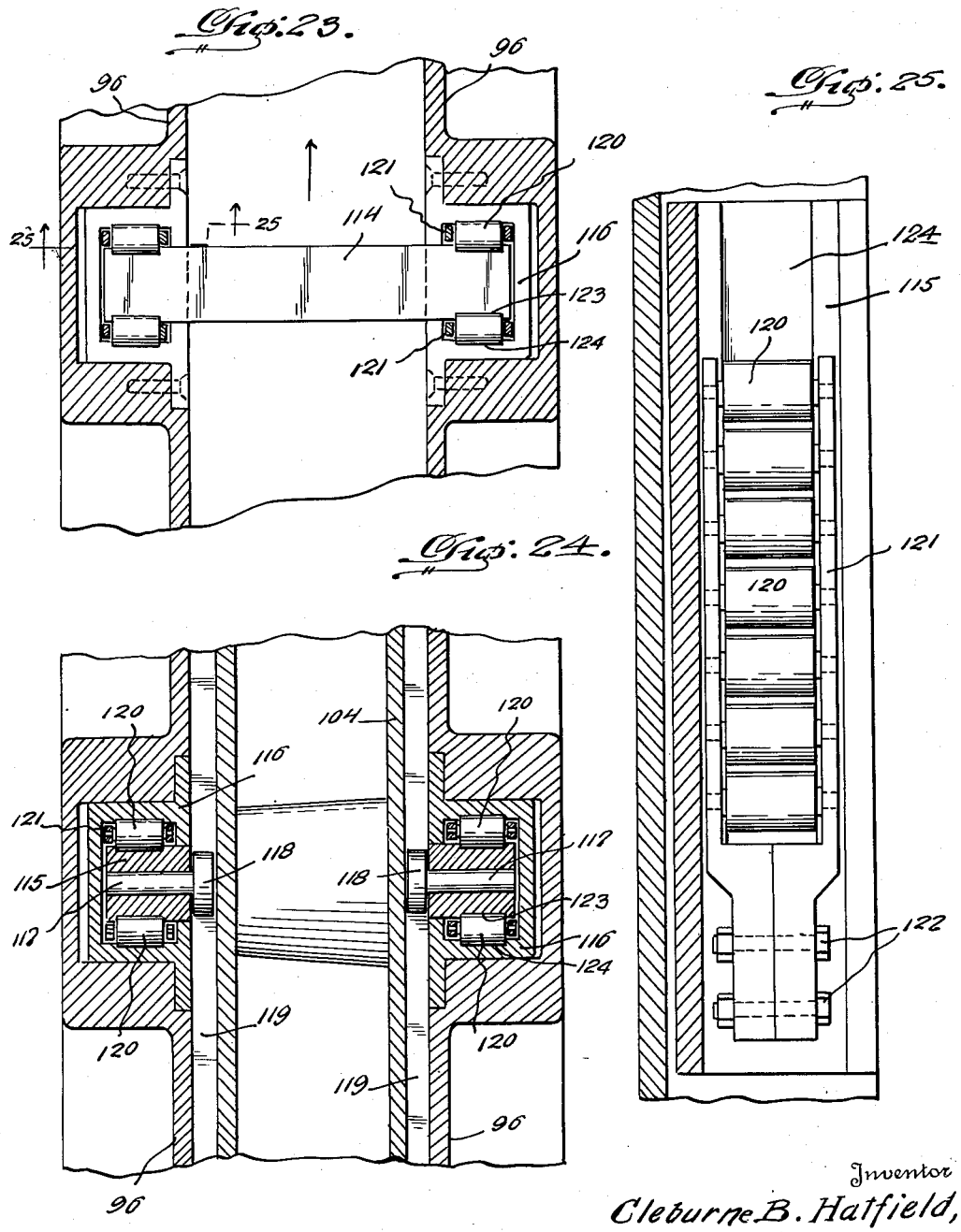

Patented Feb. 5, 1952

2,584,582

UNITED STATES PATENT OFFICE 2,584,582

FLUID PUMP OR MOTOR

Cleburne B. Hatfield, Cookeville, Tenn.

Application March 23, 1945, Serial No. 584,293

2 Claims. (Cl. 103—123)

This invention relates to rotary power units and more particularly to fluid motors or pumps of the rotary type.

The primary object of the invention is the provision of a power unit of this character wherein a rotor is mounted to revolve in a casing having two or more radially directed impact pistons or vanes cooperating with one or more gates or shutters dividing the fluid chamber into intake and exhaust areas, said gates being adapted to automatically open and close for the passing of the pistons or vanes continuously from one area to the other without escape of fluid from one area to the other during the opening and closing movements of the gate, and thereby assuring maximum efficiency in the operation of the unit.

A further object of the invention is the provision of a unit of this character wherein the pistons or vanes are of special contour and are rotated automatically for turning on their radial axes with the proper timing with the opening and closing of the gates to insure a close fitting contact between the pistons and gate while passing from the exhaust side to the intake side of the unit so that there is no loss of power, the gate construction being of novel build and unique in the arrangement of its parts and cooperation thereof with the pistons of vanes of the said unit.

A further object of the invention is the provision of a unit of this character wherein the parts thereof are precision built and cooperate progressively for the perfect working of such unit and with maximum efficiency in power and operation.

A further object of the invention resides in providing a rotary power unit wherein the pistons are fixed on the periphery of the rotor, the fluid chamber being provided with a double pair or pairs of sliding gates adapted to automatically open and close to allow the pistons to pass from the exhaust to the intake side of the chamber or chambers with a minimum of resistance and leakage of fluid.

A still further object of the invention resides in providing a rotary pump or power unit having a rotor with fixed pistons on its periphery and a radially sliding gate or gates dividing the fluid chamber into intake and exhaust areas, the said gate or gates being automatically actuated in cooperation with the pistons to permit passage of the pistons from the exhaust to the intake areas without loss of power.

A still further object of the invention is the provision of a unit of this character which is comparatively simple in construction, thoroughly reliable and efficient in operation, strong, durable, affording a heavy duty driving medium, compact, automatic in the working of its parts, and inexpensive to manufacture and install.

With these and other objects in view the invention consists in the features of construction, combination and arrangement of parts as will be hereinafter more fully described, illustrated in the accompanying drawings, which show the preferred embodiments of the essentials of the invention, and pointed out in the claims hereunto appended.

In the accompanying drawings:

Fig. 4 is a fragmentary sectional view taken approximately on the line 4—4 of Fig. 2 looking in the direction of the arrows.

Fig. 5 is an elevation of one of the shutter operating arms detached,

Fig. 6 is a side view thereof,

Fig. 7 is a sectional view taken on the line 7—7 of Fig. 1 looking in the direction of the arrows, Fig. 8 is a fragmentary schematic plan view showing the turning course of one of the pistons or vanes in its travel in the unit, Fig. 9 is a side elevational view of a modified form of the invention, Fig. 10 is a sectional view taken on line 10—10 of Fig. 9.

Figure 19:
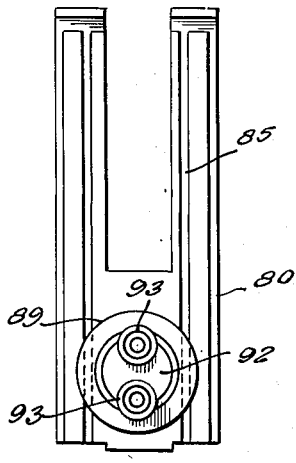

Fig. 12 is a cross sectional view of the sliding gate of the form of invention shown in Fig. 10, Fig. 13 is a sectional view taken on line 13—13 of Fig. 10, Fig. 14 is a sectional view of the connection between the gate shown in Fig. 10 and its operating arm, Fig. 14a is a detail side elevational view of the housing block for the gate operating rollers shown in Fig. 12, Fig. 15 is a side view of the bearing frame for the gate operating arm shown in Fig. 10, Fig. 16 is an end view of the roller bearing frame shown in Fig. 15, Fig. 17 is a section taken on line 17—17 of Fig. 15, Fig. 18 is a sectional view of the lower end of the operating arm shown in Fig. 19, Fig. 19 is a side view of the gate operating arm shown in Fig. 10, Fig. 20 is a section taken on line 20—20 of Fig. 9, Fig. 21 is a fragmentary cross sectional view taken perpendicular to the axis of rotation, of a further modified form of power unit, Fig. 22 is a vertical sectional view taken perpendicular to the axis of rotation of the form of invention shown in Fig. 21, Fig. 23 is a sectional view taken on lines 23—23 of Figs. 21 and 22, Fig. 24 is a sectional view taken on lines 24—24 of Figs. 21 and 22, Fig. 25 is a vertical sectional view taken on line 25—25 of Fig. 23 showing the roller bearing frame for the gate operating arm, and, Fig. 26 is a detail sectional view of the lower end of the gate operating arm shown in Fig. 21.

Similar reference characters indicate corresponding parts throughout the several views in the drawings.

Figure 2:
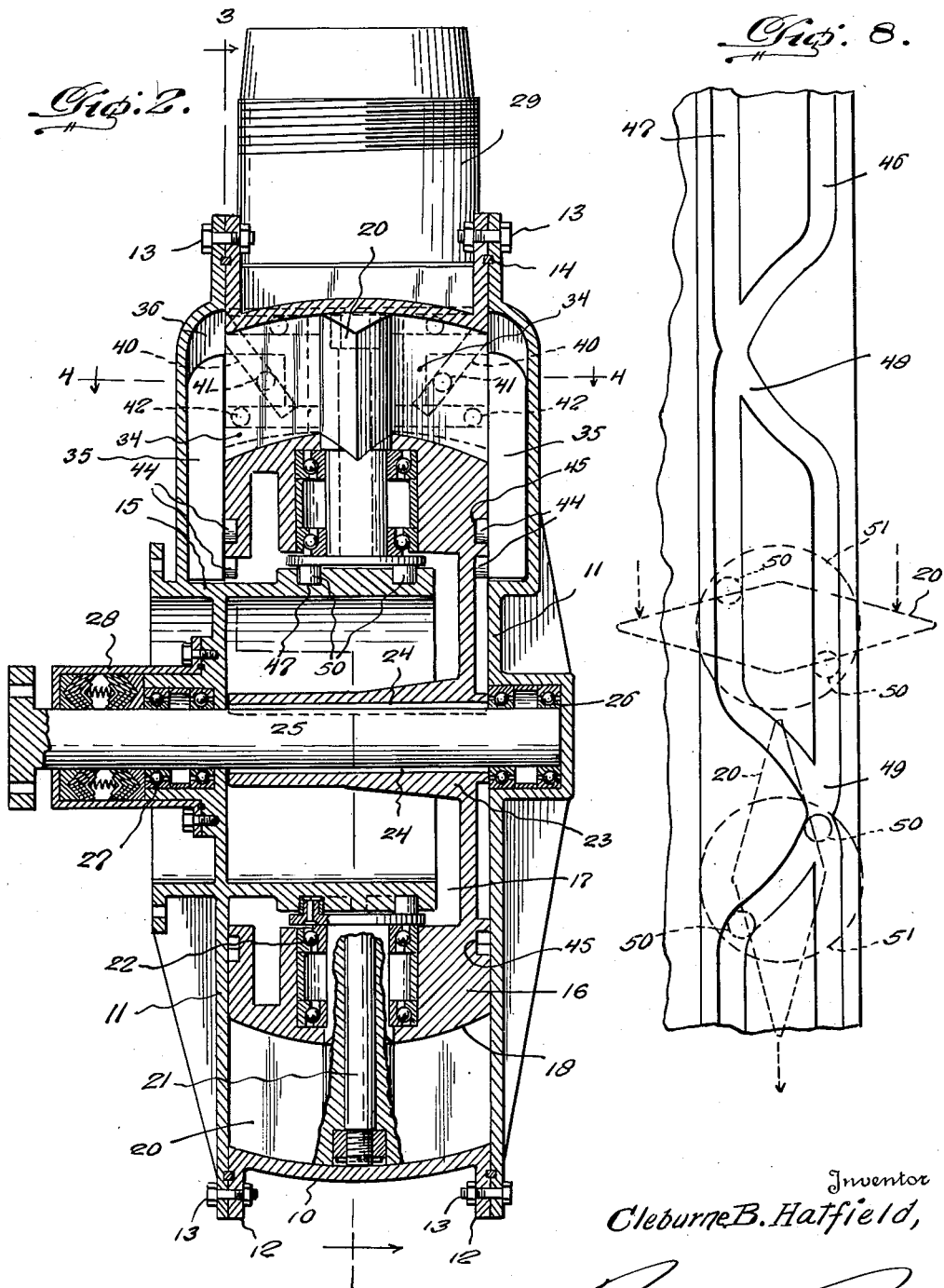
Fig. 2 is a sectional view taken on the line 2—2 of Fig. 1 looking in the direction of the arrows.
Figure 3:
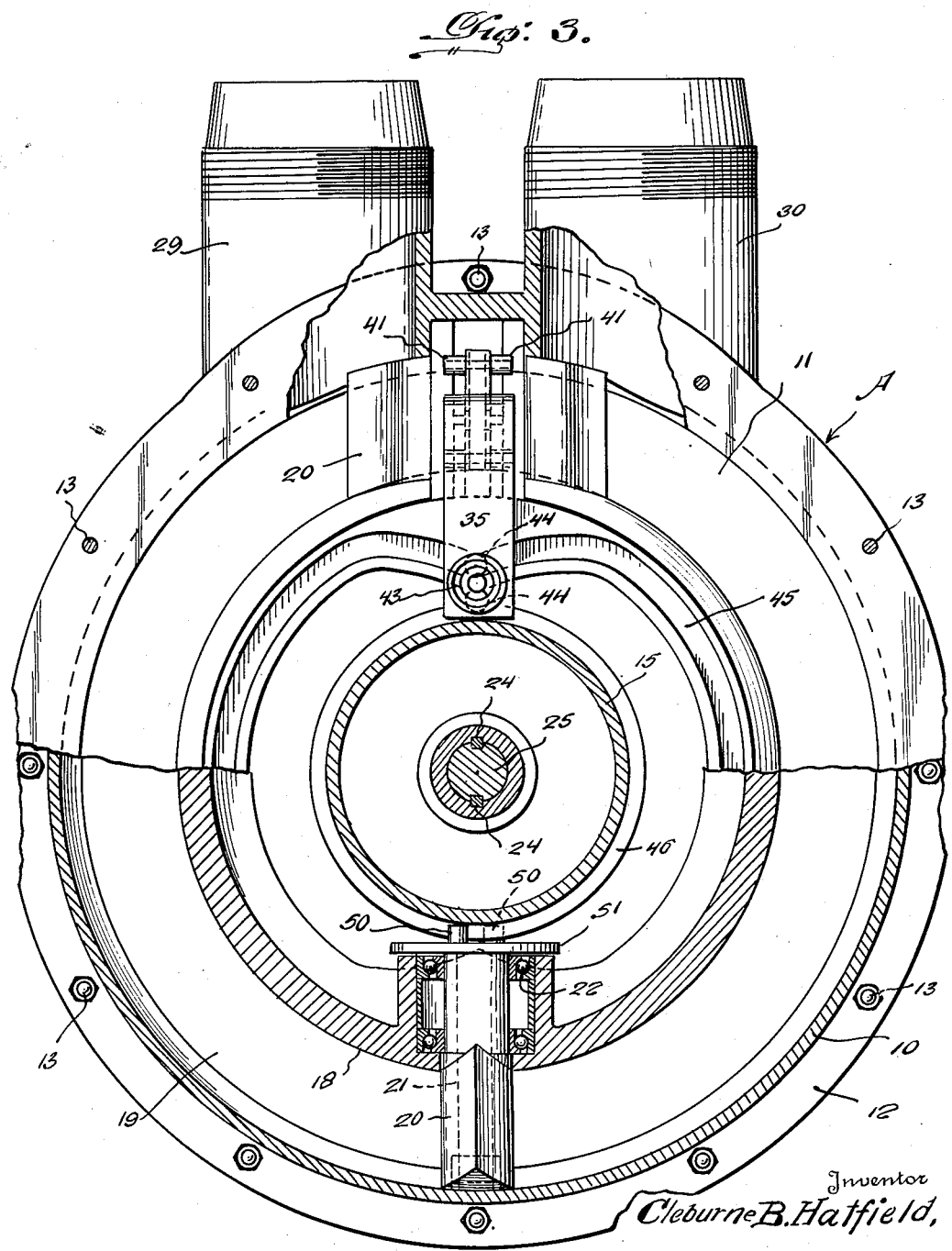
Fig. 3 is a fragmentary sectional view taken on the line 3—3 of Fig. 2 looking in the direction of the arrows.

Referring to the drawings in detail, A designates generally the power unit in its entirety constructed in accordance with the invention, and is a fluid motor or pump of the rotary type. The unit A comprises a sectional substantially circular shaped casing or housing comprising a peripheral wall 10 which is transversely curved outwardly and outer side walls 11, respectively, the latter being detachably secured to upstanding flanges 12 along the edges of the peripheral wall 10 by bolts or the like 13, and the joints therebetween are rendered fluid-tight by packing 14, as shown in Fig. 2 of the drawings. Integrally formed with one of the side walls 11 centrally thereto is a stationary cylindrical hub 15 which protrudes inwardly of the casing or housing for loose telescopic interfitting with a rotor 16 having a central recess 17 to receive the hub. The outer periphery 18 of the rotor 16 is outwardly bulged or curved correspondingly to the wall 10 and is inwardly spaced therefrom, yet snugly fitting against the inner faces of the side walls 11. The spacing of the rotor 16 from the perimeter of the casing or housing at the wall 10 affords a fluid chamber or way 19 in which travel two or more radially directed and rotatable fluid impinging pistons or vanes 20 having their turning axles 21 ball-bearing fitted at 22 in the perimeter of the rotor 16 at the transverse media thereof for carriage by the said rotor. Each piston or vane in the longitudinal direction is of substantially diamond shape while the top and bottom faces conform to the curvatures next thereto.

The rotor 16 has a center hub 23 splined or keyed at 24 to a power shaft 25, the hub 23 being extended into the hub 15, as best seen in Figure 2 of the drawings, while the shaft 25 has ball-bearing fittings 26 and 27, respectively, in association with the side walls 11, one of the bearings being related to a packing gland 28 about said shaft.

At fixed spaced points of the peripheral wall 10 of the casing or housing, preferably at the uppermost portion thereof are intake and exhaust nipples 29 and 30, respectively, which communicate with the chamber or course 19 for fluid supply and exhaust to and from the same, while within the chamber or way 19, intermediate with relation to the nipples is a pair of co-acting gates or shutters 34 slidably mounted between the double wall fencing webs 31 and 32 disposed crosswise of such chamber or way. The fencing webs are spaced apart to provide therebetween a gateway 33 corresponding in width to the greater cross sectional width of the pistons or vanes at their transverse centers for passage therethrough in the travel of the same. The webs 31 and 32 are integral with the wall 10 of the casing or housing and depend into the chamber or way 19 with snug fit on the rotor 16 at its periphery. The gates 34 which are slidably fitted between the webs 31 and 32 are synchronized in their movement to have constant contact with the opposite side faces of the pistons or vanes 20 when passing through the gateway 33, and these gates open the gateway for this passage and instantly close it behind the piston or vanes 20 on completed travel through said gateway.

The gates 34 are positively operated by throw arms 35 slidably seated in guideways 36 formed in the side walls 11 and have inturned elbows 37 provided with bifurcations 38 forming clearances to receive the gates 34, interfitted therewith. The contacting edges of the gates 34 with the pistons or vanes 20 are knife-edged at 39, and each gate in opposite side faces thereof is formed with diagonally disposed grooves 40 in which travel the anti-friction rollers 41 journaled on the bifurcations 38 of each arm 35, so that when the latter is reciprocated its companion gate 34 will shift laterally toward or away from the piston or vane next thereto. The gates 34 are supported by anti-friction rollers 42 in the webs 31 and 32, individually, to effect a straight cross movement to the said gates in the working thereof, without lifting thrust thereto by the arms 35 when actuating the same. The fencing and gate arrangement divides the chamber or way 19 into intake and exhaust areas, as best seen in Fig. 4 of the drawings.

Each arm 35 is fitted at its lower end with a ball-bearing equipped turnable bearing 43 with diametrically opposed roller carrying studs 44 which engage in cam channels 45 formed in the side faces of the rotor 16 for trackage therein, so that the gates will automatically open and close synchronously with the passing of the pistons or vanes 20 through the gateway 33 as before stated on the rotation of the said rotor in the working of the unit A.

The outer peripheral face of the hub 15 has formed therein circular tracking channels 46 and 47, respectively, which are spaced apart and in which criss-cross curvilinear switching zones 48 and 49, respectively intersect each other, for cam actions at determined periods with relation to the combined fencing and gate arrangement as before described, on the roller carrying studs 50 engaged in such trackage and upon a disklike turntable 51 unitary with each axle 21 of the pistons or vanes 20, so that the latter will be automatically turned at the cam switching zones for the passage of its narrowest gauge through the gateway 33 and back again to normalcy for fluid impinging action thereon, the lay of the channels including the switching zones 48 and 49 thereof being best seen in Fig. 8 of the drawings.

Figure 1:
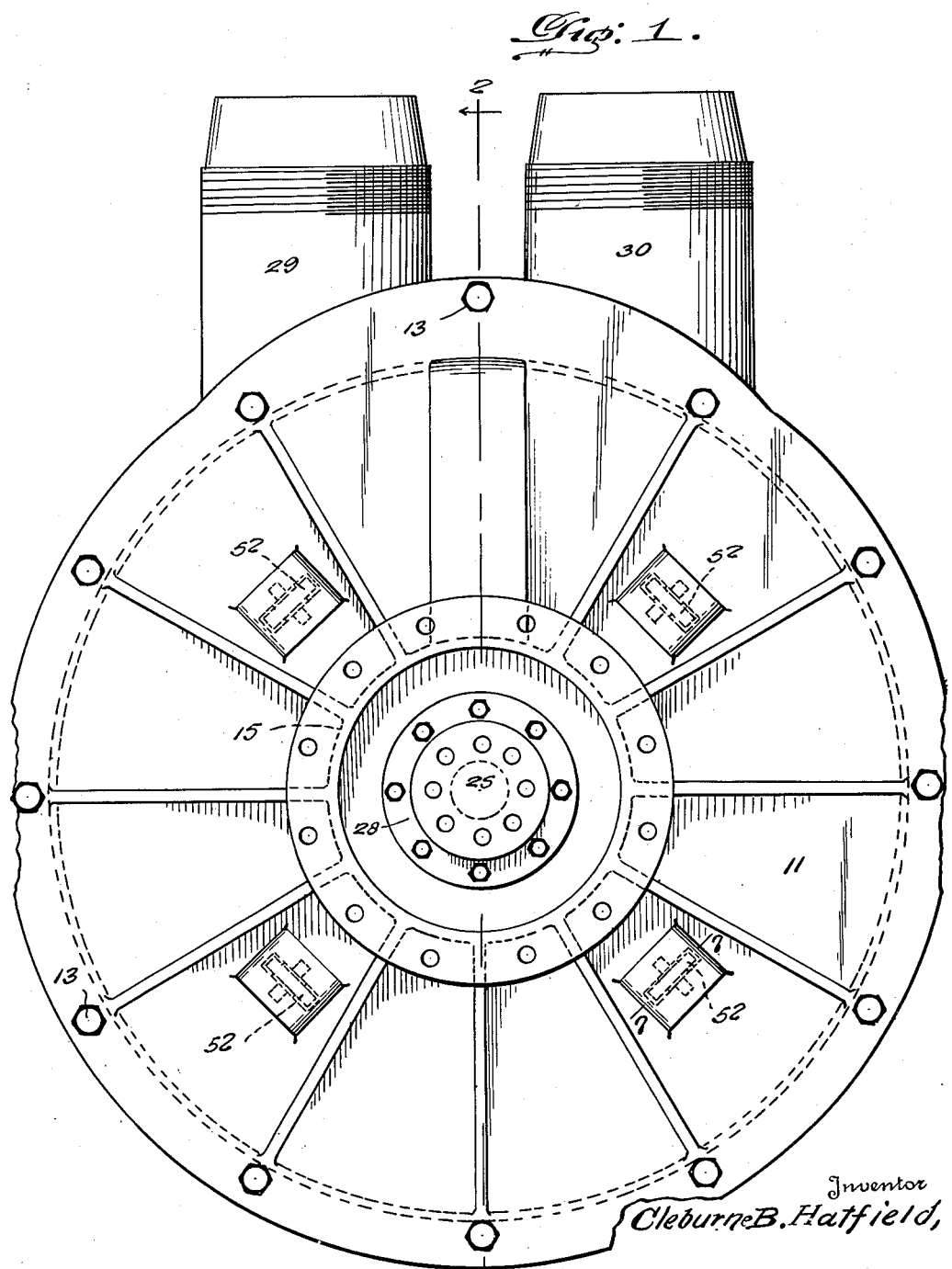
Fig. 1 is a side elevation of the unit constructed in accordance with the invention.

In the side walls 11 of the casings are counter-seated roller bearings 52 for engaging the rotor 16, as best seen in Figs. 1 and 7 of the drawings, to maintain the rotor from frictional engagement with the walls of the casing during rotation.

In the operation of the unit A it will be seen that when the rotating pistons or vanes approach the stationary fencing webs and gate they are turned approximately 90 degrees in line with the gateway and as they approach the latter the gates are gradually opened to permit the pistons or vanes to pass through the gateway to the other side of the fencing. After the rotatable pistons or vanes pass through the gateway the gates close the latter and the said pistons or vanes are reversely rotated to normal position transversely of the chamber or way 19 for fluid impact action thereon. The operation is progressively continuous with respect to the pistons or vanes and gates, with a resultant perfect operation of the unit A.

A modified form of the invention is shown in Figs. 9 to 20 inclusive. As shown in Figs. 9 and 10 the motor includes a substantially circular casing having peripheral wall 53 and side walls 54 secured to the flanges 55 of the peripheral wall by bolts 56. The side walls 54 are provided with central recesses 57 to receive the power shaft 58 rotatably mounted in the recesses by spaced ball bearing collars 59. One end of the power shaft projects from one wall of the casing through a conventional packing gland 60 and has a drive gear or flange 61 formed on its free end.

A rotor 62 is mounted to revolve within the casing and is keyed, as at 63, on the power shaft. The rotor is held from frictional contact with the side walls by ball bearing wheels 64 more clearly shown in Fig. 20. The ball bearing wheels are mounted in frames 65 seated in recesses 66 formed in the side walls 54 so that the ball bearing wheels contact the side faces of the rotor. The periphery of the rotor is spaced from the perimeter of the casing to provide a fluid chamber 67 in which the pistons or vanes 68 are adapted to travel. The pistons are fixedly attached to the periphery of the rotor at opposite sides thereof and have their ends tapered to a sharp edge, as at 69. Intake and exhaust nipples 70 and 71 extend from the periphery of the casing in spaced apart relation for admitting and exhausting the operating fluid to and from the fluid chamber.

The fluid chamber is divided into intake and exhaust areas by pairs of gates 72 and 73 extending transversely of the fluid chamber in spaced apart relation, in the area between the intake and exhaust ports. Each pair of gates are slidably mounted in pockets 74 extending laterally from the side walls of the motor casing and are surrounded by roller bearing frames 75 more clearly shown in Fig. 13. The frame 75 is rectangular in shape and the inside corners are provided with ribs 76 adapted to seat in rabbets 77 formed in the edges of the gate. The sides of the frame are provided with spaced slots to receive the rollers 78 which bear against the sides of the gate and the bearing sleeve 79 fitted within the pocket 74. It is thus seen each pair of gates are freely slidable towards and from each other so as to open or close the fluid passage.

Figure 11:
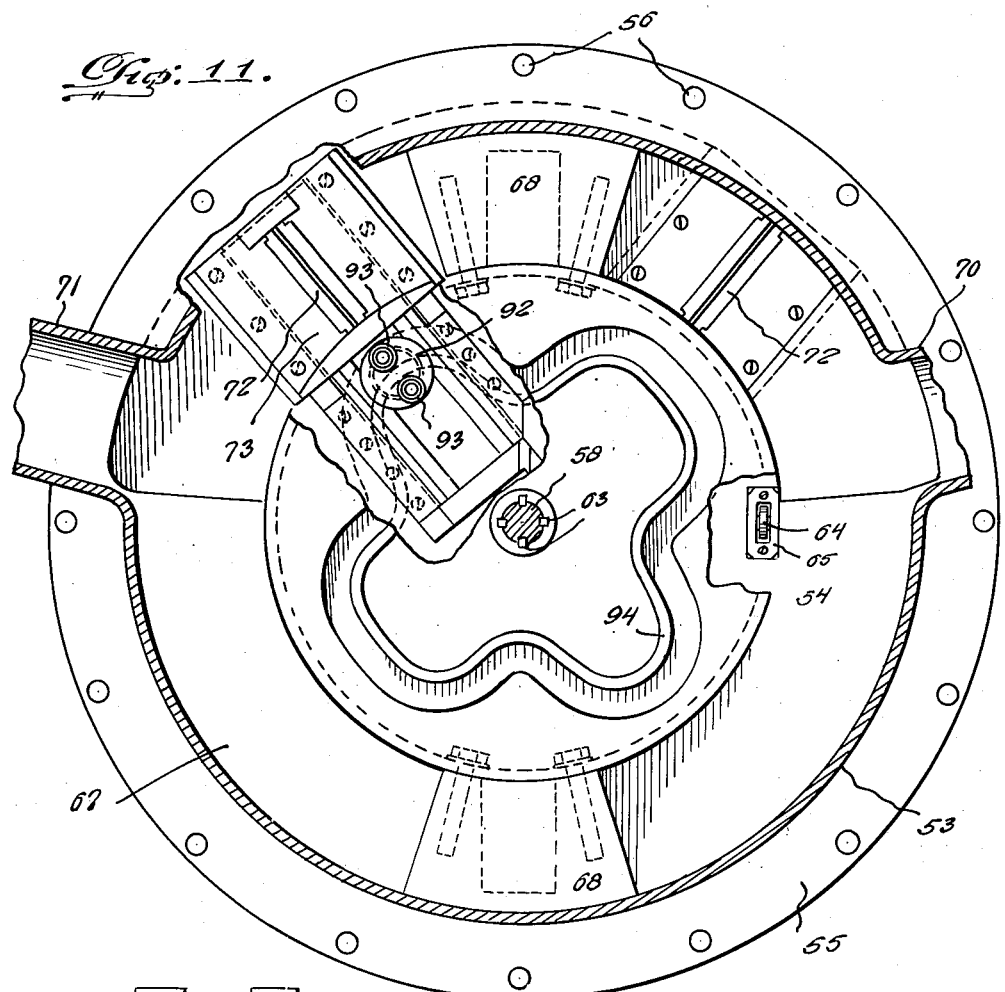
Fig. 11 is a fragmentary sectional view taken perpendicular to the axis of rotation of the form of invention shown in Fig. 9.

The operating means for the gates comprises a bifurcated arm 80, more clearly shown in Fig. 19, which straddles the gate with each branch of the bifurcation supporting a stub axle 80' on which is mounted a ball bearing roller 81 for engagement in the diagonal grooves 82 formed in the side faces of the gate. The roller 81 is seated in a recess in the housing block 81' formed integral with the stub axle and projects through an opening for engagement with the side of the groove 82. The arm 80 is slidably mounted in roller bearing frames 83 which engage around each side of the arm. The frames 83 as shown in Figs. 15, 16 and 17 are substantially U-shape with inturned flanges 84 which engage in grooves 85 formed in the arms and rollers 86 confined in the slots 87 in the walls of the frame bear against the faces of the arm and walls of the chamber 88 which extends down from the pockets 74. The pockets 74 and chamber 88 are formed integral with the side wall of the motor casing. A boss 89 extends laterally from the lower end of the arm 80 having a stud 90 rotatably mounted therein by ball bearing collars 91. A disk 92 is formed integral with one end of the stud and supports oppositely disposed ball bearing rollers 93 which engage the cam track 94 formed on the side face of the rotor 62, as shown in Fig. 11. The cam track is designed to successively open and close the pairs of gates to allow the pistons to pass from the exhaust to the intake area of the fluid chamber.

In operation, the pair of gates nearest the exhaust nipple will be gradually opened as the piston passes through the passage provided by the opening of the gates and will immediately close as the piston completes its travel through the passage. While the piston is passing through the first pair of gates the second pair of gates are closed which will prevent any fluid escaping through the first gates from the passage into the intake area of the fluid chamber. After the first gates are closed the second gates are gradually opened to allow for the passage of the piston. The successive opening and closing of the pairs of gates permits the piston to pass from the exhaust area to the intake area of the fluid chamber with a minimum of resistance and leakage of fluid between the intake and exhaust areas of the fluid chamber.

A further modified form of the invention is shown in Figs. 21 to 26 inclusive wherein a single vertically sliding gate is employed to divide the fluid chamber of the motor into intake and exhaust areas having simple and efficient means for actuating the gate in synchronism with the passage of the piston from the exhaust to the intake area of the fluid chamber.

The motor comprises a casing of substantially circular shape having a peripheral wall 95 and side walls 96 secured to the flanges 97 of the peripheral wall by bolts 98. The side walls 96 have central recesses 99 to receive a power shaft 100 rotatably mounted in the recesses by ball bearing collars 101. One end of the shaft 100 extends through a packing gland 102 and has a drive gear or flange 103 formed on its end. A rotor 104 is keyed on the shaft, as at 105, within the casing and the periphery of the rotor is spaced from the wall 95 of the casing to provide a fluid chamber 106. Pistons 107 are attached to the periphery of the rotor at opposite sides, the outer faces of the pistons being longitudinally curved, as at 108.

The upper portion of the peripheral wall 95 of the casing between the intake and exhaust ports 109 and 110, respectively, is raised upwardly to provide spaced chambers 111, 112 and 113. These chambers are provided with top and side walls but are open at the bottom to provide communication with the fluid chamber. The central chamber 112 receives the vertically sliding gate 114 which when pulled downwardly intersects the fluid chamber and separates the intake from the exhaust area. The gate is actuated by depending arms 115 disposed in guideways 116 formed in the side walls of the casing on opposite sides of the rotor. As shown in Fig. 26 the lower end of the arms is provided with a stub shaft 117 on which is mounted a ball bearing roller 118 adapted to ride in the cam groove 119 formed in the side faces of the rotor. The cam groove imparts a reciprocating movement to the gate which is timed to open gradually as the piston approaches the gate and to close after the piston has passed the gate. The arms 115 operate in the guideways 116 between roller bearings 120 which are mounted in frames 121 composed of sections secured together by bolts 122, as shown in Fig. 25. The roller bearings engage in grooves 123 formed in the sides of the arms and in grooves 124 formed in the walls of the guideways, insuring free sliding movement of the arms when reciprocated. The chambers 112 and 113 arranged on opposite sides of the gate serve as air pockets to allow for expansion of the fluid pressure built up in the fluid chamber on either side of the gate which facilitates the passage of the pistons from the exhaust to the intake area of the fluid chamber.

In operation, as the piston approaches the sliding gate the cam track in the side face of the rotor will impart an upward thrust on the operating arms of the gate causing the gate to rise gradually with the lower edge of the gate in close contact with the curved surface of the piston. As the piston passes the gate, the latter is gradually lowered to a closed position, the cooperation between the piston and gate being such there is a minimum leakage of fluid from the exhaust area to the intake area of the fluid chamber.

It is to be understood that the forms of my invention herein shown and described are to be considered preferred examples of the same and certain changes in the shape, size and arrangement of the parts may be made without departing from the spirit of the invention or the scope of the subjoined claims.

Having thus described my invention, I claim:

1. A power unit comprising a cylindrical casing provided with inlet and exhaust ports in its peripheral wall, a rotor mounted in said casing to provide a fluid chamber between the periphery of the rotor and peripheral wall of said casing, pistons carried by said rotor movable in said fluid chamber, a valve chamber extending upwardly from the peripheral wall of said casing intermediate the inlet and exhaust ports, a gate valve mounted to reciprocate in said valve chamber adapted to intersect said fluid chamber, means operably connecting said gate valve to said rotor for reciprocating the same, air chambers on opposite sides of said valve chamber extending between the valve chamber and said inlet and exhaust ports, said air chambers being closed at the top and open at the bottom for communication with the fluid chamber.

2. A power unit comprising a cylindrical casing having inlet and exhaust ports in its peripheral wall, a rotor mounted in said casing to provide a fluid chamber between the periphery of said rotor and peripheral wall of said casing, pistons carried by said rotor movable in said fluid chamber, an upwardly extending valve chamber integral with the peripheral wall of said casing intermediate the inlet and exhaust ports, a gate valve mounted to reciprocate in said valve chamber adapted to intersect said fluid chamber, arms depending from said gate valve on opposite sides of said rotor having longitudinal grooves in opposite sides, guideways mounted in the walls of said casing to slidably receive said arms having grooves in opposite walls in confronting relation to the grooves in said arms, roller bearing frames disposed in said guideways between the sides of said arms and walls of said guideways having a series of roller bearings in bearing engagement with the grooves of said arms and guideways, and means on the lower ends of said arms operably connected to said rotor for reciprocating the arms to move said gate valve.

CLEBURNE B. HATFIELD.

REFERENCES CITED

The following references are of record in the file of this patent:

UNITED STATES PATENTS

| Number | Name | Date |
|---|---|---|
| 6,906 | Sweeny | Nov. 27, 1849 |
| 21,632 | Trimmer | Sept. 28, 1858 |
| 45,596 | Foster | Dec. 27, 1864 |
| 51,713 | Grover et al. | Dec. 26, 1865 |
| 517,985 | Smith | Apr. 10, 1894 |
| 528,493 | Sivertson | Oct. 30, 1894 |
| 713,301 | Hagerty | Nov. 11, 1902 |
| 1,066,413 | Johnson | July 1, 1913 |

FOREIGN PATENTS

| Number | Country | Date |
|---|---|---|
| 4,627 | Great Britain | 1900 |
| 9,465 | Great Britain | 1887 |
| 295,541 | Italy | Apr. 25, 1932 |
| 426,675 | Great Britain | Apr. 8, 1935 |